(12) United States Patent
Magnus

(10) Patent No.: US 12,340,226 B2
(45) Date of Patent: Jun. 24, 2025

(54) VECTOR INSTRUCTION CRACKING AFTER SCALAR DISPATCH

(71) Applicant: SiFive, Inc., San Mateo, CA (US)

(72) Inventor: Kathlene Rose Magnus, San Antonio, TX (US)

(73) Assignee: SiFive, Inc., Santa Clara, CA (US)

( * ) Notice: Subject to any disclaimer, the term of this patent is extended or adjusted under 35 U.S.C. 154(b) by 108 days.

(21) Appl. No.: 18/469,008

(22) Filed: Sep. 18, 2023

(65) Prior Publication Data

US 2024/0126556 A1 Apr. 18, 2024

Related U.S. Application Data

(60) Provisional application No. 63/415,473, filed on Oct. 12, 2022.

(51) Int. Cl.
*G06F 9/38* (2018.01)
*G06F 9/30* (2018.01)

(52) U.S. Cl.
CPC ........ *G06F 9/3867* (2013.01); *G06F 9/30036* (2013.01); *G06F 9/3856* (2023.08)

(58) Field of Classification Search
None
See application file for complete search history.

(56) References Cited

U.S. PATENT DOCUMENTS

| 7,945,760 | B1 * | 5/2011 | Barry | G06F 9/30032 |
| | | | | 711/202 |
| 11,243,778 | B1 * | 2/2022 | Hurkat | G06F 9/3889 |
| 2013/0159668 | A1 * | 6/2013 | Muff | G06F 15/8053 |
| | | | | 712/7 |
| 2021/0216318 | A1 * | 7/2021 | Langhammer | G06F 9/30072 |
| 2022/0179652 | A1 * | 6/2022 | Bhardwaj | G06F 9/3802 |

FOREIGN PATENT DOCUMENTS

WO WO-2022053183 A1 * 3/2022 ............ G06F 15/78

* cited by examiner

*Primary Examiner* — Eric Coleman
(74) *Attorney, Agent, or Firm* — Kilpatrick Townsend & Stockton LLP

(57) ABSTRACT

Apparatus and methods for vector instruction cracking after scalar dispatch are described. An integrated circuit includes a primary pipeline and a vector pipeline. The primary pipeline is configured to determine a type of instruction, responsive to a determination that the instruction is a vector instruction, create a reorder buffer entry in a reorder buffer for the vector instruction prior to out-of-order processing in the primary pipeline, and send the vector instruction to a vector pipeline. The vector pipeline is configured to process the vector instruction.

20 Claims, 6 Drawing Sheets

VECTOR INSTRUCTION CRACKING AFTER SCALAR DISPATCH

CROSS REFERENCE TO RELATED APPLICATION

This application claims priority to and the benefit of U.S. Provisional Patent Application Ser. No. 63/415,473 filed on Oct. 12, 2022, the entire disclosure of which is hereby incorporated by reference.

TECHNICAL FIELD

This disclosure relates generally to central processing units or processor cores and, more specifically, to cracking vector instructions in a vector pipeline after scalar dispatch of the vector instructions from a main or primary pipeline.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
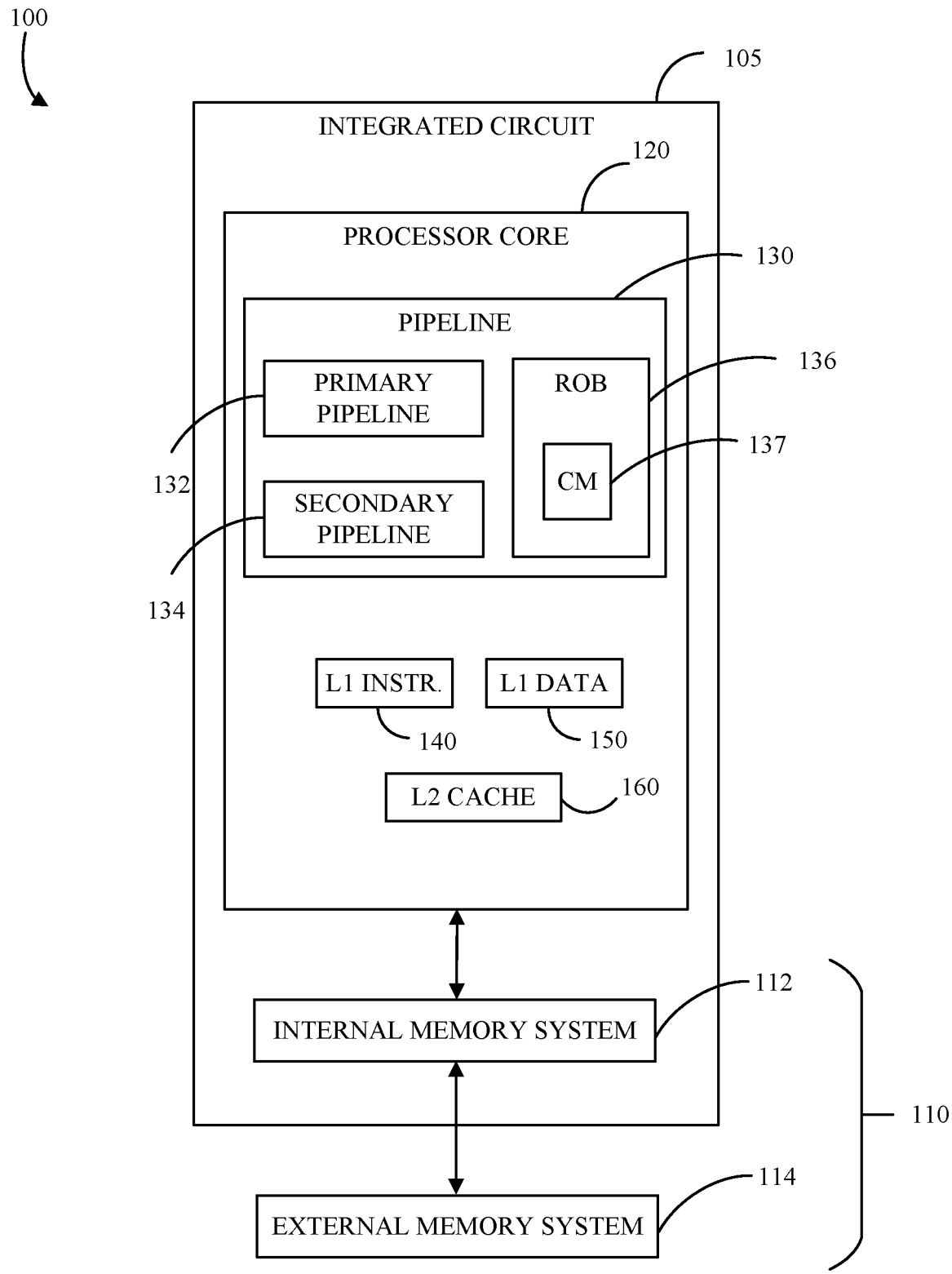
FIG. 1 is a block diagram of an example of an integrated circuit for executing scalar and vector instructions using a primary pipeline and a vector pipeline.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The pipeline may process a fetched instruction, which may be, but is not limited to, a scalar instruction and a vector instruction. Each instruction is decoded by a decoder unit into one or more micro-operations in addition to other processing. Decoding of vector instructions requires decoding and executing of vector configuration instructions to generate vector configuration information. The vector configuration information is then used to decode the vector instructions into the one or more micro-operations. In addition, due to the nature and size of vector instructions (i.e., the number of micro-operations that need to be generated), the decoding and related processing can take longer relative to scalar instruction decode processing. As a result, decoding of a vector instruction may block the decode unit or decoder from any other processing while the vector instruction micro-operation generation or expansion is being done.

Implementations described herein are designed to improve the performance of a pipelined architecture by using a dual pipeline topology. The dual pipeline topology may decouple certain of the pipeline operations as described herein. Each pipeline in the dual pipeline topology may have their own decode units, rename units, dispatch units, execution units, physical and/or virtual registers, caches, queues, data paths, and/or other logic associated with instruction flow. In the dual pipeline topology, a decode unit in a main or primary pipeline (collectively "primary pipeline") may detect certain or defined instructions, which may be sent from a dispatch unit in the primary pipeline to a secondary decoder or sequencer in a secondary pipeline. The certain instructions are not processed by the decode and rename units or stages in the primary pipeline. The certain instructions are cracked in the secondary pipeline. That is, the certain instructions are decoded into their micro-operations by a secondary decoder in the secondary pipeline. In some implementations, the primary pipeline and the secondary pipeline may be out-of-order pipelines. In these implementations, the primary pipeline and the secondary pipeline may share a reorder buffer (ROB), in which a ROB entry may be created for each instruction at or before out-of-order processing in the primary pipeline. The secondary decoder may update the ROB entry with a number of micro-operations after cracking the certain instruction. In some implementation, the primary pipeline may have a primary ROB and the secondary pipeline may have a secondary ROM. In these implementations, a ROB entry may be made in the primary ROB by the primary pipeline and one or more ROB entry (ies) may be made in the secondary ROM after cracking, which are each associated with the ROB entry in the primary ROB. That is, in the implementations, a two stage ROB entry process is implemented for the certain instructions.

In some implementations, the primary pipeline and the secondary pipeline can be a scalar pipeline and a vector pipeline that are out-of-order pipelines. For example, an Instruction Set Architecture (ISA) (such as the RISC-V ISA) may implement scalar and vector instructions. Scalar instructions may take arguments that consist of a single element of data and vector instructions may take arguments that may include multiple elements of data to be processed by a single instruction. Scalar instructions may be implemented in the scalar pipeline and vector instructions may be implemented in the vector pipeline.

In some implementations, the scalar pipeline (which is the primary pipeline) may include a scalar decode unit, a scalar rename unit, a scalar dispatch unit, scalar execution units, and/or other logic associated with instruction flow, and the vector pipeline may include a vector decode unit, a vector rename unit, a vector dispatch unit, vector execution units, and/or other logic associated with instruction flow. In response to a determination by the scalar decode unit that an instruction is a scalar instruction, the scalar pipeline may create an entry in a ROB, decode, rename, dispatch, and execute the scalar instruction.

In response to a determination by the scalar decode unit that the instruction is a vector instruction, the scalar pipeline may create a single ROB entry at any point prior to out-of-order processing in the scalar pipeline and perform in-order pass through of the vector instruction to the vector pipeline. That is, the scalar pipeline foregoes decoding and renaming of the vector instruction. In some implementations, the scalar pipeline may include an in-order buffer to store the vector instruction prior to sending to the vector pipeline. The in-order buffer may be used in the event a vector decoder is busy or a vector rename unit is stalled because there is no free vector physical register. The vector pipeline may decode the vector instruction, update the ROB entry with the number of micro-operations, rename the vector operands, and execute the vector instruction or decoded micro-operations.

In the event that the vector instruction includes scalar sources and/or destinations, a scalar rename unit may rename scalar operands. That is, the vector instruction is partially decoded. In these instances, an internal transfer bus may be utilized to synchronously transfer data between the scalar and vector pipelines. This is described in Applicant Docket No. SIFT-207-A, which is incorporated herein by reference as if fully set forth in its entirety. In some implementations, the operand transfer may be from the scalar pipeline to the vector pipeline, from the vector pipeline to the scalar pipeline, or both. The scalar pipeline passes through the rest of the vector instruction including the vector operands. The vector operands are renamed in the vector pipeline and processed accordingly. That is, the primary pipeline and the secondary pipeline may use a two-stage rename process.

In response to a determination by the scalar decode unit that the instruction is a vector configuration instruction, the scalar pipeline may create an entry in a ROB, decode, rename, dispatch, and execute the vector configuration instruction since access to configuration status registers may be needed. The scalar pipeline may send vector configuration information resulting from execution of the vector configuration instruction to the vector pipeline. That is, the vector pipeline may wait to execute the vector instructions until execution of the vector configuration instruction and receipt of the vector configuration information. Advantageously, the scalar pipeline is not similarly impacted due to the dual pipeline structure and may process further instructions as the waiting vector instruction may be decoded in the vector pipeline In some implementations, the ROB may include a completion mechanism or data structure which can track completion of each micro-operation generated from the scalar instruction and/or the vector instruction. In some implementations, the completion mechanism may be a counter set to the number of micro-operations. The counter may be decremented upon receipt of a completion signal from an appropriate scalar and/or vector pipeline component, such as but not limited to, an execution unit. The ROB entry for the scalar and/or vector instruction may be retired once the counter reaches zero.

In some implementations, the completion mechanism may be a counter set to zero. The counter may be incremented upon receipt of a completion signal from an appropriate scalar and/or vector pipeline component, such as but not limited to, an execution unit. The ROB entry may be retired once the counter reaches the number of micro-operations.

In some implementations, the completion mechanism may be a bit map and/or array having a size equal to the number of micro-operations. Each bit may be set (cleared). A specific bit may be cleared (set) upon receipt of a completion signal from an appropriate scalar and/or vector pipeline component, such as but not limited to, an execution unit. The ROB entry may be retired once the bit map is completely cleared (set). In this implementation, a value in a particular bit position may indicate a micro-instruction which may be having execution issues, may be stalled, and/or the like.

In some implementations, the vector pipeline may include a vector ROB, in which the vector decoder may create ROB entries for the micro-operations. The vector ROB may include the completion mechanism as described herein. The vector ROB may update the ROB, as appropriate. For example, the vector ROB may signal the ROB to retire a ROB entry for a vector instruction upon completion of the micro-instructions corresponding to the vector instruction.

FIG. 1 is a block diagram of an example of a system 100 including an integrated circuit 105 and a memory system 110. The integrated circuit 105 may include a processor core 1210. The integrated circuit 105 could be implemented, for example, as a field-programmable gate array (FPGA), an application-specific integrated circuit (ASIC), or a system-on-chip (SoC). The memory system 110 may include an internal memory system 112 and an external memory system 114. The internal memory system 112 may be in communication with the external memory system 114. The internal memory system 112 may be internal to the integrated circuit 105 (e.g., implemented by the FPGA, the ASIC, or the SoC). The external memory system 114 may be external to integrated circuit 105 (e.g., not implemented by the FPGA, the ASIC, or the SoC). The internal memory system 112 may include, for example, a controller and memory, such as random access memory (RAM), static random access memory (SRAM), cache, and/or a cache controller, such as a level three (L3) cache and an L3 cache controller. The external memory system 114 may include, for example, a controller and memory, such as dynamic random access memory (DRAM) and a memory controller. In some implementations, the memory system 110 may include memory mapped inputs and outputs (MMIO), and may be connected to non-volatile memory, such as a disk drive, a solid-state drive, flash memory, and/or phase-change memory (PCM).

The processor core 120 may include circuitry for executing instructions, such as one or more pipelines 130, a level one (L1) instruction cache 140, an L1 data cache 150, and a level two (L2) cache 160 that may be a shared cache. The processor core 120 may fetch and execute instructions in the one or more pipelines 130, for example, as part of a program sequence. The instructions may cause memory requests (e.g., read requests and/or write requests) that the one or more pipelines 130 may transmit to the L1 instruction cache 140, the L1 data cache 150, and/or the L2 cache 160.

Each of the one or more pipelines 130 may include a primary pipeline 132, a secondary pipeline 134, and a reorder buffer (ROB) 136. The primary pipeline 132 and the secondary pipeline 134 each have separate decode units, rename units, dispatch units, execution units, physical and/or virtual registers, caches, queues, data paths, and/or other logic associated with instruction flow. The primary pipeline 132 and the secondary pipeline 134 may both be connected to the ROB 136. In some implementations, the primary pipeline 132 and the secondary pipeline 134 may be out-of-order pipelines. In some implementations, the primary pipeline 132 may be a scalar pipeline and the secondary pipeline 134 may be a vector pipeline.

Implementations of this disclosure are designed to improve the efficiency of processing instructions by processing some instructions from decode through execution in the primary pipeline 132 and effectively passing through other instructions to the secondary pipeline 134 for processing from decode through execution. Each instruction fetched by the processor core 120 is initially input to or handled by the primary pipeline 132. The main pipeline 132 may generate a ROB entry, decode, rename, dispatch, and execute an instruction upon detection or determination that the instruction is of a first type. The ROB entry may be generated at any point prior to out-of-order processing in the primary pipeline 132. The primary pipeline 132 may pass through the instruction to the secondary pipeline 134 upon detection or determination that the instruction is of a second type. The primary pipeline 132 does not decode and rename the second type of instruction prior to sending to the secondary pipeline 134. The secondary pipeline 134 may decode, rename, dispatch, and execute with respect to the second type of instruction. That is, the secondary pipeline 134 may decode or crack the second type of instruction into a number of micro-operations and update the ROB entry in the ROB 136 associated with the second type of instruction.

The ROB 136 may include a completion mechanism or data structure 137 to track completion of the first type of instruction, the second type of instruction, and/or other types of instructions. In some implementations, a decoded instruction may generate a number of micro-operations. In some implementations, the completion mechanism 137 may be a counter set to the number of micro-operations. The counter may be decremented upon receipt of a completion signal from an appropriate component in the primary pipeline 132 and/or the secondary pipeline 134, such as but not limited to, an execution unit. The ROB entry for the first type and/or the second type instruction may be retired once the counter reaches zero. In some implementations, the completion mechanism 137 may be a counter set to zero. The counter may be incremented upon receipt of a completion signal from an appropriate component in the primary pipeline 132 and/or the secondary pipeline 134, such as but not limited to, an execution unit. The ROB entry may be retired once the counter reaches the number of micro-operations.

In some implementations, the completion mechanism 137 may be a bit map and/or array having a size equal to the number of micro-operations. Each bit may be set (cleared). A specific bit may be cleared (set) upon receipt of a completion signal from an appropriate component in the primary pipeline 132 and/or the secondary pipeline 134, such as but not limited to, an execution unit. The ROB entry may be retired once the bit map is completely cleared (set). In this implementation, a value in a particular bit position may indicate a micro-instruction which may be having execution issues, may be stalled, and/or the like.

In some implementations, the secondary pipeline 134 may include a secondary ROB (as shown and described in FIG. 4), in which a secondary decoder in the secondary pipeline 134 may create ROB entries for the micro-operations. The secondary ROB may include the completion mechanism 137 as described herein. The secondary ROB may update the ROB, as appropriate. For example, the secondary ROB may signal the ROB to retire a ROB entry for a second type instruction upon completion of the micro-instructions corresponding to the second type instruction.

In some implementations, the primary pipeline 132 is a scalar pipeline, the secondary pipeline 134 is a vector pipeline, the first type of instruction is a scalar instruction, and the second type of instruction is a vector instruction.

Figure 3:
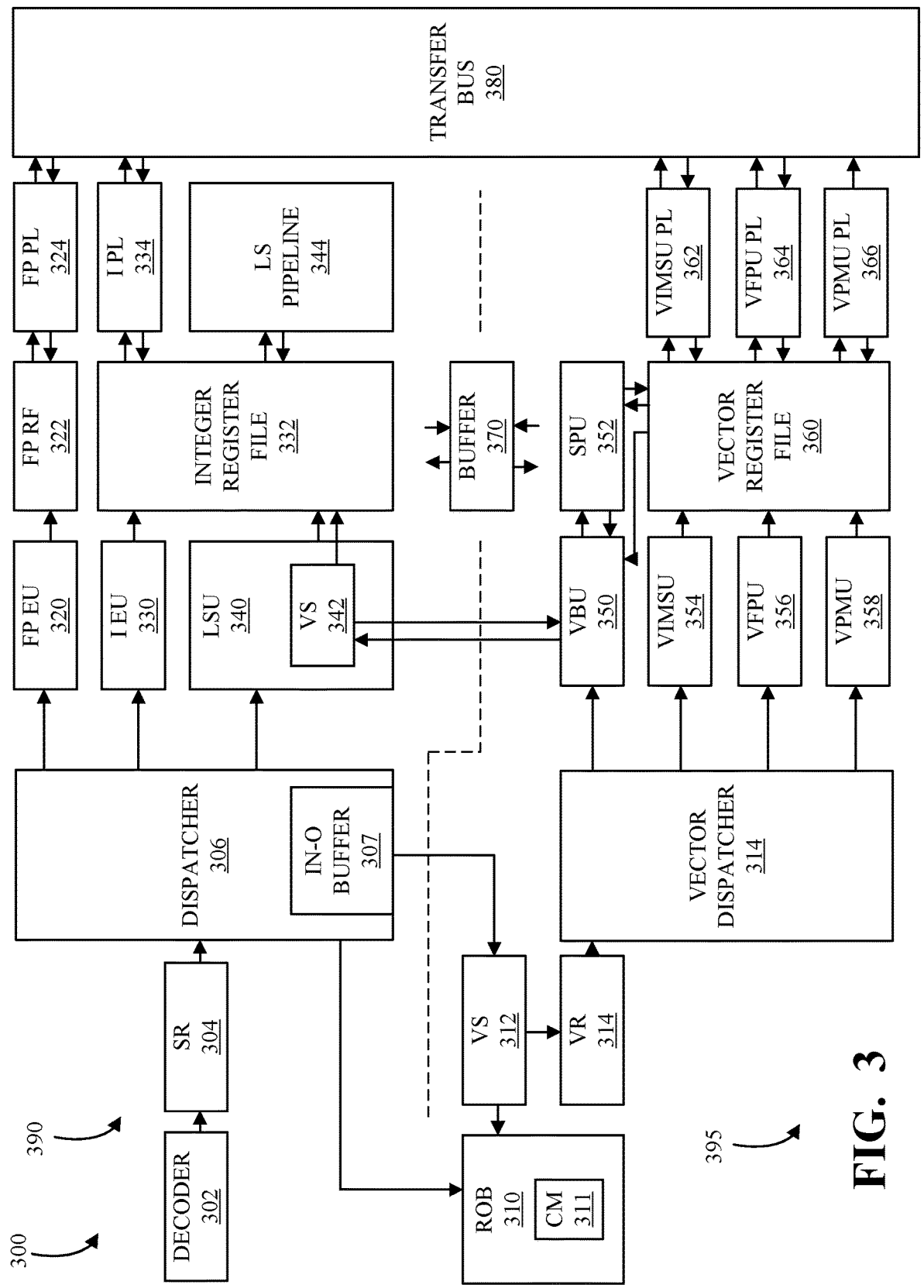
FIG. 3 is a block diagram of an example of dual pipelines with associated circuitry in a processor core executing scalar and vector instructions.

In some implementations, a vector instruction can include scalar sources and/or destinations. In these instances, the primary pipeline 132 or scalar pipeline can rename the scalar operands and the vector pipeline can rename the vector operands. In these instances, an internal transfer buffer (as shown in FIG. 3) may be utilized to synchronously transfer data between the scalar and vector pipelines. In some implementations, the scalar operands from the vector instruction may be sent to execution units in the vector pipeline via the internal transfer buffer. The vector instruction is executed in the vector pipeline.

In some implementations, for a vector configuration instruction, the scalar pipeline may create an entry in the ROB 136, decode, rename, dispatch, and execute the vector configuration instruction as the scalar pipeline has access to configuration status registers not accessible by the vector pipeline. The scalar pipeline may send vector configuration information resulting from execution of the vector configuration instruction to the vector pipeline. The vector pipeline may wait to execute the vector instructions until execution of the vector configuration instruction and receipt of the vector configuration information.

The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

Figure 2:
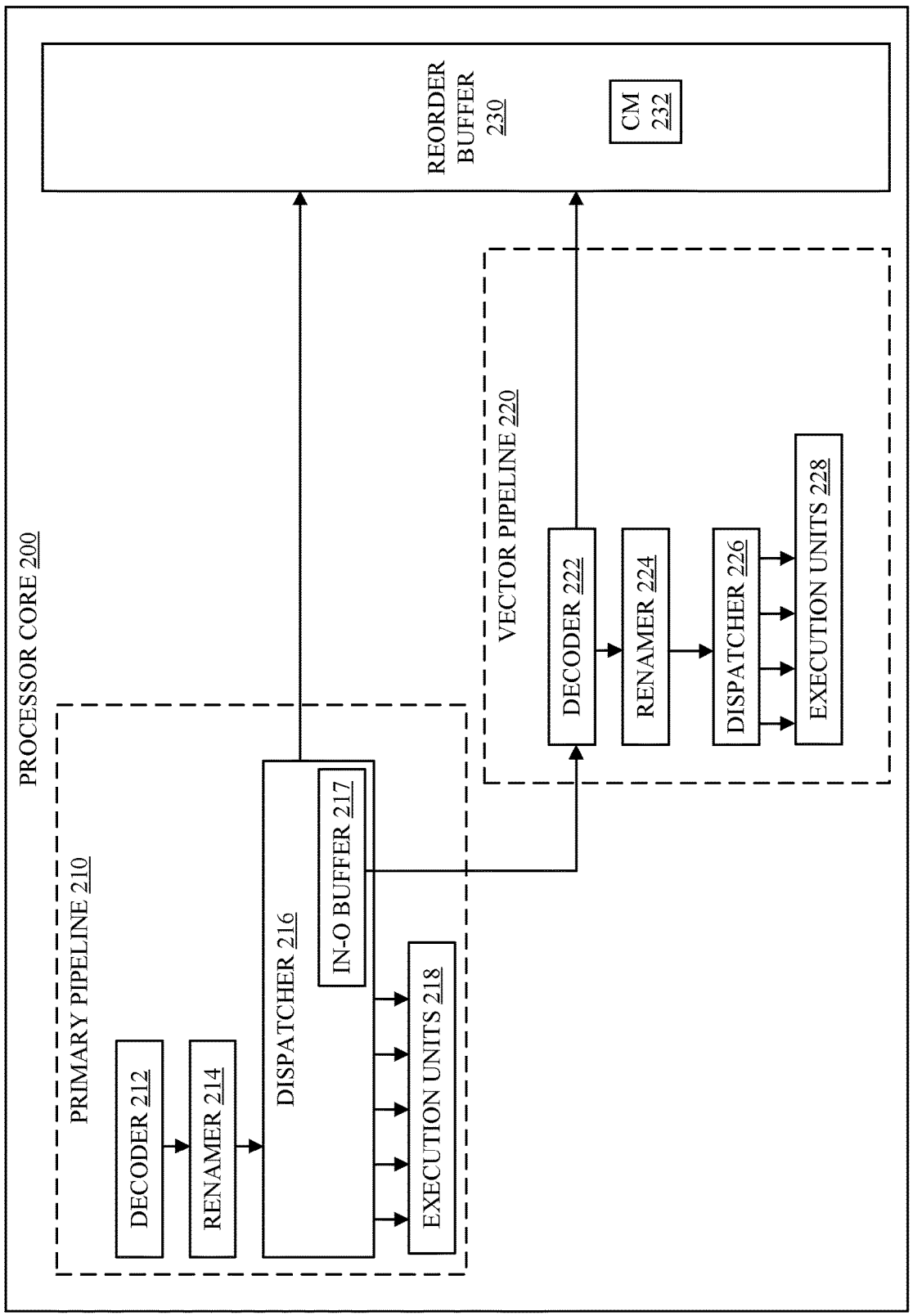
FIG. 2 is a block diagram of an example of dual pipelines in a processor core executing scalar and vector instructions.

FIG. 2 is a block diagram of an example of dual pipelines in a processor core 200 executing scalar and vector instructions. The processor core 200 may be like the processor core 105 shown in FIG. 1. The processor core 200 may implement a microarchitecture. The processor core 200 may be configured to fetch, decode, rename, dispatch, and execute instructions of an instruction set instruction set architecture (ISA) (e.g., the RISC-V instruction set) in pipelined data paths like the one or more pipelines 130 shown in FIG. 1. The instructions may execute speculatively and out-of-order in the processor core 200. The processor core 200 may be a compute device, a microprocessor, a microcontroller, or a semiconductor intellectual property (IP) core or block. The processor core 200 may be implemented by an integrated circuit like the integrated circuit 105 shown in FIG. 1. In some implementations, the processor core 200 may be implemented by the integrated circuit with one or more additional processor cores in a cluster that is connected via an interconnection network.

The processor core 200 may implement components of the microarchitecture (e.g., dispatch units, execution units, vector units, registers, caches, queues, data paths, and/or other logic associated with instruction flow as discussed herein). For example, the processor core 200 may include a primary pipeline 210 connected to or in communication (collectively "connected") a vector pipeline 220, each of which are connected to a ROB 230.

The primary pipeline 210 may include a decoder 212 connected to a renamer 214, which in turn is connected to a dispatcher or dispatch unit 216. The dispatcher 216 may be connected to execution units 218 and to ROB 230. In some implementations, the connection to the ROB 230 may be at any point in the primary pipeline 210 prior to out-of-order processing in the scalar pipeline 210. In some implementations, the connection to the ROB 230 may be at the decoder 212, the renamer 214, or at the dispatch unit 216. The primary pipeline 210 and components therein may be configured to determine an instruction type, process scalar instructions, process vector configuration instructions, and/or process in part or partially process, scalar operands of a vector instruction.

The vector pipeline 220 may include a decoder 222 connected to the ROB 230 and a renamer 224, which in turn is connected to a dispatcher or dispatch unit 226. The dispatcher 216 in the primary pipeline 210 may include an in-order buffer 217, which is connected to the decoder 222. The dispatcher 226 may be connected to execution units 228. The vector pipeline 220 and components therein may be configured to process vector instructions.

The primary pipeline 210 and the vector pipeline 220 may implement a split instruction decode where machine state dependent instruction sequencing (i.e., cracking) may be done later in the vector pipeline 220. In this instance, a ROB entry generation may be done in a first decode stage (or at any point prior to out-of-order processing in the scalar pipeline) and then a ROB entry update in a second decode stage.

The primary pipeline 210 and the vector pipeline 220 may also implement a split register renaming where each rename unit in a respective pipeline renames different operand types. A primary or first rename unit may handle scalar operands (e.g., integer (INT) and/or floating point (FP)) and a vector or second rename unit handles vector operands (e.g., vector (VEC)).

Operationally, upon determination of a scalar instruction by the decoder 212, the decoder 212 may decode the scalar instruction into one or more micro-operations, the renamer 214 may rename the scalar operands, the dispatcher 216 may dispatch the one or more micro-operations to the execution units 218, and the execution units 218 may execute the one or more micro-operations. The primary pipeline 210, at a point or component prior to out-of-order processing in the primary pipeline 210, may generate an entry(ies) in the ROB 230 for the one or more micro-operations. A completion mechanism 232 may track completion of the one or more micro-operations and retire the ROB entry accordingly. The completion mechanism 232 may be, for example, the completion mechanism 137 of FIG. 1.

Operationally, upon determination of a vector instruction by the decoder 212, the decoder 212 may forego decoding the vector instruction, the renamer 214 may forego renaming the vector operands, and the dispatcher 216 may dispatch, via the in-order buffer 217, the vector instruction to the decoder 222. The scalar pipeline 210, at a point or component prior to out-of-order processing in the primary pipeline 210, may generate an entry in the ROB 230 for the vector instruction. The decoder 222 may decode the vector instruction into one or more micro-operations, the decoder 222 may update the ROB entry with the number of micro-operations associated with the vector instruction, the renamer 224 may rename the vector operands, the dispatcher 226 may dispatch the one or more micro-operations to the execution units 228, and the execution units 228 may execute the one or more micro-operations. The completion mechanism 232 may track completion of the number of micro-operations and retire the ROB entry accordingly. In these implementations, the decoder 222 may wait for vector configuration information from the primary pipeline 210. The primary pipeline 210 may decode and resolve a vector configuration instruction, such as a VSET instruction in the RISC-V ISA, and send the vector configuration information to the vector pipeline 220 so that the decoder 222 can perform decoding of the vector instruction.

Table 1 shows an example of vector cracking, vector decoding, or vector sequencing, i.e., micro-operation generation from a vector instruction. In this instance, the vector operation is a vector add which is decoded into 8 micro-operations.

TABLE 1

LMUL = 8, where LMUL specifies the number of vector registers that are grouped
Macro instruction: vadd.vv v16, v8, v0
Micro-op:
• vadd.vv v16, v8, v0
• vadd.vv v17, v9, v1
• vadd.vv v18, v10, v2
• vadd.vv v19, v11, v3
• vadd.vv v20, v12, v4
• vadd.vv v21, v13, v5
• vadd.vv v22, v14, v6
• vadd.vv v23, v15, v7

Note:
Not all configuration is provided for ease of illustration.

Table 2 shows an example of wide vector sequencing. In this instance, the vector operation is a vector add which is decoded into 2 micro-operations.

TABLE 2

LMUL = 1
Macro instruction: vadd.wv v16, v8, v0
Micro-op:
• vadd.vv v16, v8, v0
• vadd.vv v17, v8, v0

Note:
Not all configuration is provided for ease of illustration.

Operationally, upon determination of a vector instruction with one of scalar sources or scalar destinations, the renamer 214 may rename the scalar operands, and the dispatcher 216 may dispatch, via the in-order buffer 217, the vector instruction to the decoder 222. The primary pipeline 210, at a point or component prior to out-of-order processing in the primary pipeline 210, may generate an entry in the ROB 230 for the vector instruction. The decoder 222 may decode the vector instruction into one or more micro-operations, the decoder 222 may update the ROB entry with the number of micro-operations associated with the vector instruction, the renamer 224 may rename the vector operands, the dispatcher 226 may dispatch the one or more micro-operations to the execution units 228, and the execution units 228 may execute the one or more micro-operations. The primary pipeline 210 may provide scalar operand information to the vector pipeline 220 via an internal buffer as shown in FIG.

3. The completion mechanism 232 may track completion of the number of micro-operations and retire the ROB entry accordingly.

The processing core 200 and each component in the processing core 200 is illustrative and can include additional, fewer, or different components which may be similarly or differently architected without departing from the scope of the specification and claims herein. Moreover, the illustrated components can perform other functions without departing from the scope of the specification and claims herein.

FIG. 3 is a block diagram of an example of dual pipelines with associated circuitry in a processor core 300 executing scalar and vector instructions. The processor core 300 may be like the processor core 105 shown in FIG. 1 and the processor core 200 of FIG. 2. The processor core 300 may implement a microarchitecture. The processor core 300 may be configured to fetch, decode, rename, dispatch, and execute instructions of an instruction set instruction set architecture (ISA) (e.g., the RISC-V instruction set) in pipelined data paths like the one or more pipelines 130 shown in FIG. 1. The instructions may execute speculatively and out-of-order in the processor core 300. The processor core 300 may be a compute device, a microprocessor, a microcontroller, or a semiconductor intellectual property (IP) core or block. The processor core 300 may be implemented by an integrated circuit like the integrated circuit 105 shown in FIG. 1. In some implementations, the processor core 300 may be implemented by the integrated circuit with one or more additional processor cores in a cluster that is connected via an interconnection network.

The processor core 300 may implement components of the microarchitecture (e.g., dispatch units, execution units, vector units, registers, caches, queues, data paths, and/or other logic associated with instruction flow as discussed herein). For example, the dual pipelines of the processor core 300 may include a primary pipeline 390 connected to or in communication (collectively "connected") a vector pipeline 395, where each of the primary pipeline 390 and the vector pipeline 395 are connected to a ROB 310, an internal transfer buffer 370, and a transfer bus 380.

The primary pipeline 390 may include a decoder 302 connected to a scalar renamer 304, which in turn is connected to a dispatcher 306. The dispatcher 306 may be connected to a ROB 310. The dispatcher 306 may be connected to a floating point path which includes a floating point execution unit 320, a floating point register file 322, and a floating point pipeline 324. The dispatcher 306 may be connected to an integer path which includes an integer execution unit 330, an integer register file 332, and an integer pipeline 334. The dispatcher 306 may be connected to a load store path which includes a load store unit 340, the integer register file 332, and a load store pipeline 344. Outputs of the floating point pipeline 324 and the integer pipeline 334 are connected to a transfer bus 380, and the outputs of the floating point pipeline 324, the integer pipeline 334, and the load store pipeline 344 are connected to the floating point register file 322 and the integer register file 332, respectively. The primary pipeline 390 and components therein may be configured to execute scalar instructions.

The vector pipeline 395 may include a vector sequencer 312 connected to the ROB 310 and a vector renamer 344, which in turn is connected to a vector dispatcher 314. The vector dispatcher 314 may be connected to a vector baler unit 350, which in turn is connected to a vector sequencer 342 in the load store unit 342 and to segment permute unit 352, which is further connected to a vector register file 360.

The vector dispatcher 314 may be connected to a vector integer/move/slide unit 354, which in turn is connected to the vector register file 360. The vector dispatcher 314 may be connected to a vector floating point unit 356, which in turn is connected to the vector register file 360. The vector dispatcher 314 may be connected to a vector permute/mask unit 358, which in turn is connected to the vector register file 360. The vector register file 360 is connected to a vector integer/move/slide pipeline 362, a vector floating point pipeline 364, and a vector permute/mask pipeline 366. The outputs of the vector integer/move/slide pipeline 362, the vector floating point pipeline 364, and the vector permute/mask pipeline 366 are connected to the transfer bus 380. The vector pipeline 395 and components therein may be configured to execute vector instructions.

Operationally, upon determination of a scalar instruction, the decoder 302 may decode the scalar instruction into one or more micro-operations, the scalar renamer 304 may rename the scalar operands, the dispatcher 306 may dispatch the one or more micro-operations via one or more of the floating point path, the integer path, and/or the load store path. The primary pipeline 210, at a point or component prior to out-of-order processing in the primary pipeline 390, may generate an entry(ies) in the ROB 310 for the one or more micro-operations. A completion mechanism 311 may track completion of the one or more micro-operations and retire the ROB entry accordingly. The completion mechanism 311 may be, for example, the completion mechanism 137 of FIG. 1.

Operationally, upon determination of a vector instruction, the decoder 302 may forego decoding the vector instruction, the scalar renamer 304 may forego renaming the vector operands, and the dispatcher 306 may dispatch, via an in-order buffer 307, the vector instruction to the vector sequencer 312. The primary pipeline 390, at a point or component prior to out-of-order processing in the scalar pipeline 390, may generate an entry in the ROB 310 for the vector instruction. The vector sequencer 312 may decode the vector instruction into one or more micro-operations, the vector sequencer 312 may update the ROB entry with the number of micro-operations associated with the vector instruction, the vector renamer 314 may rename the vector operands, the vector dispatcher 314 may dispatch the one or more micro-operations to one or more the vector baler unit 350, the vector integer/move/slide unit 354, the vector floating point unit 356, and/or the vector permute/mask unit 358 for processing through the segment permute unit 352, the vector register file 360, the vector integer/move/slide pipeline 362, the vector floating point pipeline 364, and/or the vector permute/mask pipeline 366 for execution, as appropriate and applicable. The completion mechanism 311 may track completion of the number of micro-operations and retire the ROB entry accordingly. In this instance, the vector sequencer 312 may wait for vector configuration information from the primary pipeline 390. The primary pipeline 390 may decode and resolve a vector configuration instruction, such as a VSET instruction of the RISC-V ISA), and send the vector configuration information to the vector pipeline 395 so that the vector sequencer 312 can perform decoding of the vector instruction.

Operationally, upon determination of a vector instruction with one of scalar sources or scalar destinations, the scalar renamer 304 may rename the scalar operands, and the dispatcher 306 may dispatch, via the in-order buffer 307, the vector instruction to the vector sequencer 312. The primary pipeline 390, at a point or component prior to out-of-order processing in the scalar pipeline 390, may generate an entry in the ROB 310 for the vector instruction. The vector sequencer 312 may decode the vector instruction into one or more micro-operations, the vector sequencer 312 may update the ROB entry with the number of micro-operations associated with the vector instruction, the vector renamer 314 may rename the vector operands, the vector dispatcher 314 may dispatch the one or more micro-operations for execution as described herein for the vector instruction. The primary pipeline 390 may provide scalar operand information to the vector pipeline 395 via an internal buffer 370. The completion mechanism 310 may track completion of the number of micro-operations and retire the ROB entry accordingly.

The processing core 300 and each component in the processing core 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
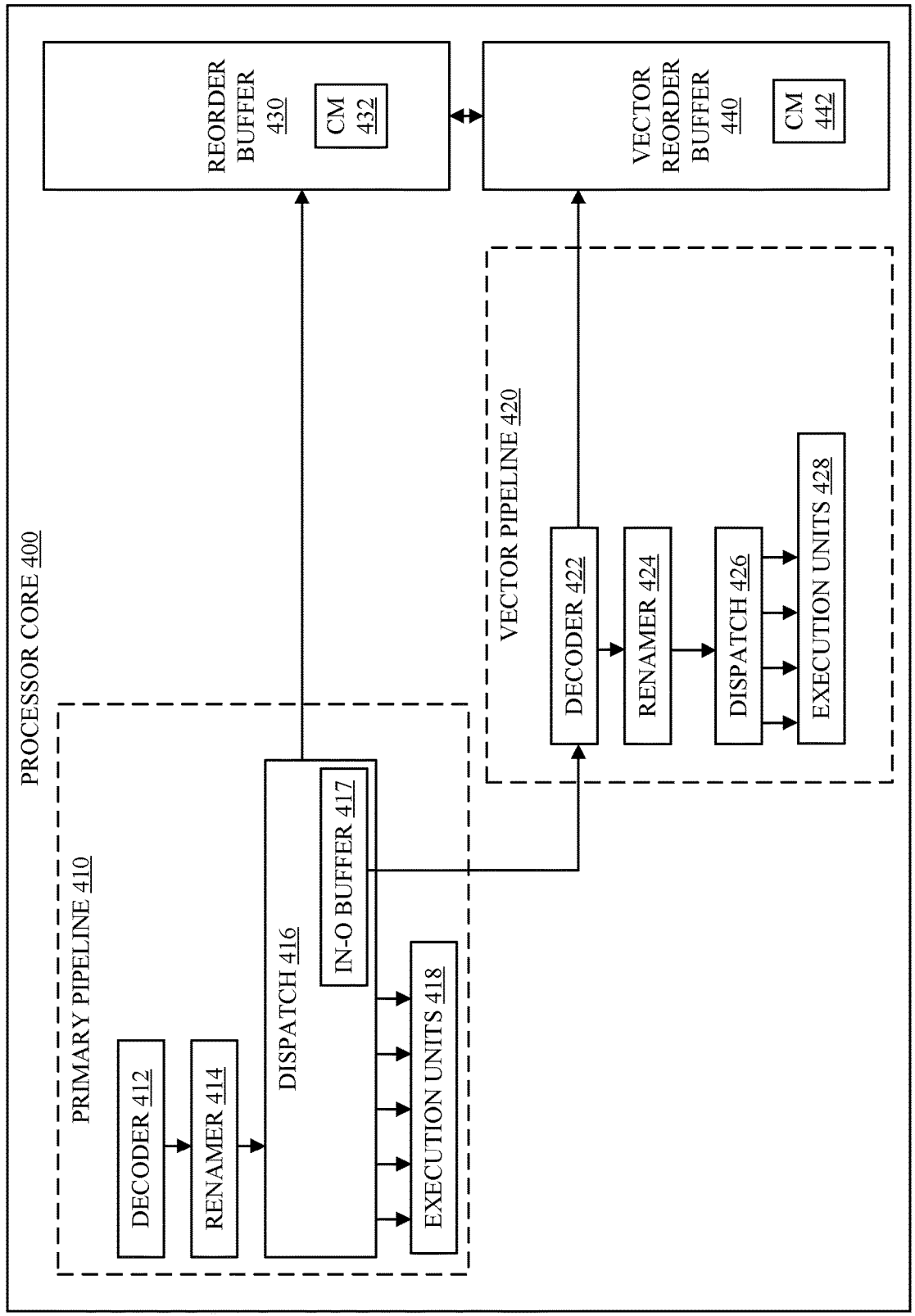
FIG. 4 is a block diagram of another example of dual pipelines in a processor core executing scalar and vector instructions.

FIG. 4 is a block diagram of an example of dual pipelines in a processor core 400 executing scalar and vector instructions. The processor core 400 may be like the processor core 105 shown in FIG. 1. The processor core 400 may implement a microarchitecture. The processor core 400 may be configured to fetch, decode, rename, dispatch, and execute instructions of an instruction set instruction set architecture (ISA) (e.g., the RISC-V instruction set) in pipelined data paths like the one or more pipelines 130 shown in FIG. 1. The instructions may execute speculatively and out-of-order in the processor core 400. The processor core 400 may be a compute device, a microprocessor, a microcontroller, or a semiconductor intellectual property (IP) core or block. The processor core 400 may be implemented by an integrated circuit like the integrated circuit 105 shown in FIG. 1. In some implementations, the processor core 400 may be implemented by the integrated circuit with one or more additional processor cores in a cluster that is connected via an interconnection network.

The processor core 400 may implement components of the microarchitecture (e.g., dispatch units, execution units, vector units, registers, caches, queues, data paths, and/or other logic associated with instruction flow as discussed herein). For example, the processor core 400 may include a primary pipeline 410 connected to or in communication (collectively "connected") a vector pipeline 420 and a ROB 430. The vector pipeline 420 and the ROB 430 may be connected to a vector ROB 440.

The primary pipeline 410 may include a decoder 412 connected to a renamer 414, which in turn is connected to a dispatcher or dispatch unit 416. The dispatcher 416 may be connected to execution units 418 and to the ROB 430. In some implementations, the connection to the ROB 430 may be at any point in the primary pipeline 410 prior to out-of-order processing in the primary pipeline 210. In some implementations, the connection to the ROB 430 may be at the decoder 412, the renamer 414, or at the dispatch unit 216. The primary pipeline 410 and components therein may be configured to process scalar instructions, vector configuration instructions, and/or partially process scalar operands in a vector instruction.

The vector pipeline 420 may include a decoder 422 connected to the vector ROB 440 and a renamer 424, which in turn is connected to a dispatcher or dispatch unit 426. The dispatcher 416 in the primary pipeline 410 may include an in-order buffer 417, which is connected to the decoder 422. The dispatcher 426 may be connected to execution units 428. The vector pipeline 420 and components therein may be configured to process vector instructions.

The primary pipeline 410 and the vector pipeline 420 may implement a split instruction decode where machine state dependent instruction sequencing (i.e., cracking) may be done later in the vector pipeline 420 for vector instructions. In this instance, a ROB entry generation may be done in a first decode stage (or at any point prior to out-of-order processing in the primary pipeline) and then a ROB entry update may be done in a second decode stage. In this implementation, the ROB entry update may be done in the vector ROB 440 as described herein. In this instance, the vector ROB 440 may track the micro-operations generated from the vector instruction and update the ROB 430 accordingly.

The primary pipeline 410 and the vector pipeline 420 may also implement split register renaming where each rename unit in a respective pipeline renames different operand types. A first rename unit may handle scalar operands (e.g., integer (INT) and/or floating point (FP)) and a second rename unit may handle vector operands (e.g., vector (VEC)).

Operationally, upon determination of a scalar instruction, the decoder 412 may decode the scalar instruction into one or more micro-operations, the renamer 414 may rename the scalar operands, the dispatcher 416 may dispatch the one or more micro-operations to the execution units 418, and the execution units 418 may execute the one or more micro-operations. The primary pipeline 410, at a point or component prior to out-of-order processing in the scalar primary 410, may generate an entry(ies) in the ROB 430 for the one or more micro-operations. A completion mechanism 432 may track completion of the one or more micro-operations and retire the ROB entry accordingly. The completion mechanism 432 may be, for example, the completion mechanism 137 of FIG. 1.

Operationally, upon determination of a vector instruction, the decoder 412 may forego decoding the vector instruction, the renamer 414 may forego renaming the vector operands, and the dispatcher 416 may dispatch, via the in-order buffer 417, the vector instruction to the decoder 422. The primary pipeline 410, at a point or component prior to out-of-order processing in the scalar pipeline 410, may generate an entry in the ROB 430 for the vector instruction. The decoder 422 may decode the vector instruction into one or more micro-operations, the decoder 422 may generate or update a ROB entry in the vector ROB 440 with the number of micro-operations associated with the vector instruction, the renamer 424 may rename the vector operands, the dispatcher 426 may dispatch the one or more micro-operations to the execution units 428, and the execution units 428 may execute the one or more micro-operations. A completion mechanism 442 may track completion of the number of micro-operations, retire the ROB entry in the vector RB 440, and update the ROB entry in the ROB buffer 430, accordingly. In this instance, the decoder 422 may wait for vector configuration information from the primary pipeline 410. The primary pipeline 410 may decode and resolve a vector configuration instruction, such as a VSET instruction of the RISC-V ISA, and send the vector configuration information to the vector pipeline 420 so that the decoder 422 can perform decoding of the vector instruction.

Operationally, upon determination of a vector instruction with one of scalar sources or scalar destinations, the renamer 414 may rename the scalar operands, and the dispatcher 416 may dispatch, via the in-order buffer 417, the vector instruction to the decoder 422. The primary pipeline 410, at a point or component prior to out-of-order processing in the scalar pipeline 410, may generate an entry in the ROB 230 for the vector instruction. The primary pipeline 410 may provide scalar operand information to the vector pipeline 420 via an internal buffer as shown in FIG. 3. The decoder 422 may decode the vector instruction into one or more micro-operations, the decoder 422 may update the ROB entry in the vector ROB 440 with the number of micro-operations associated with the vector instruction, the renamer 424 may rename the vector operands, the dispatcher 426 may dispatch the one or more micro-operations to the execution units 428, and the execution units 428 may execute the one or more micro-operations. The completion mechanism 442 may track completion of the number of micro-operations, retire the ROB entry in the vector RB 440, and update the ROB entry in the ROB buffer 430, accordingly.

The processing core 400 and each component in the processing core 200 is illustrative and can include additional, fewer, or different components which may be similarly or differently architected without departing from the scope of the specification and claims herein. Moreover, the illustrated components can perform other functions without departing from the scope of the specification and claims herein.

Figure 5:
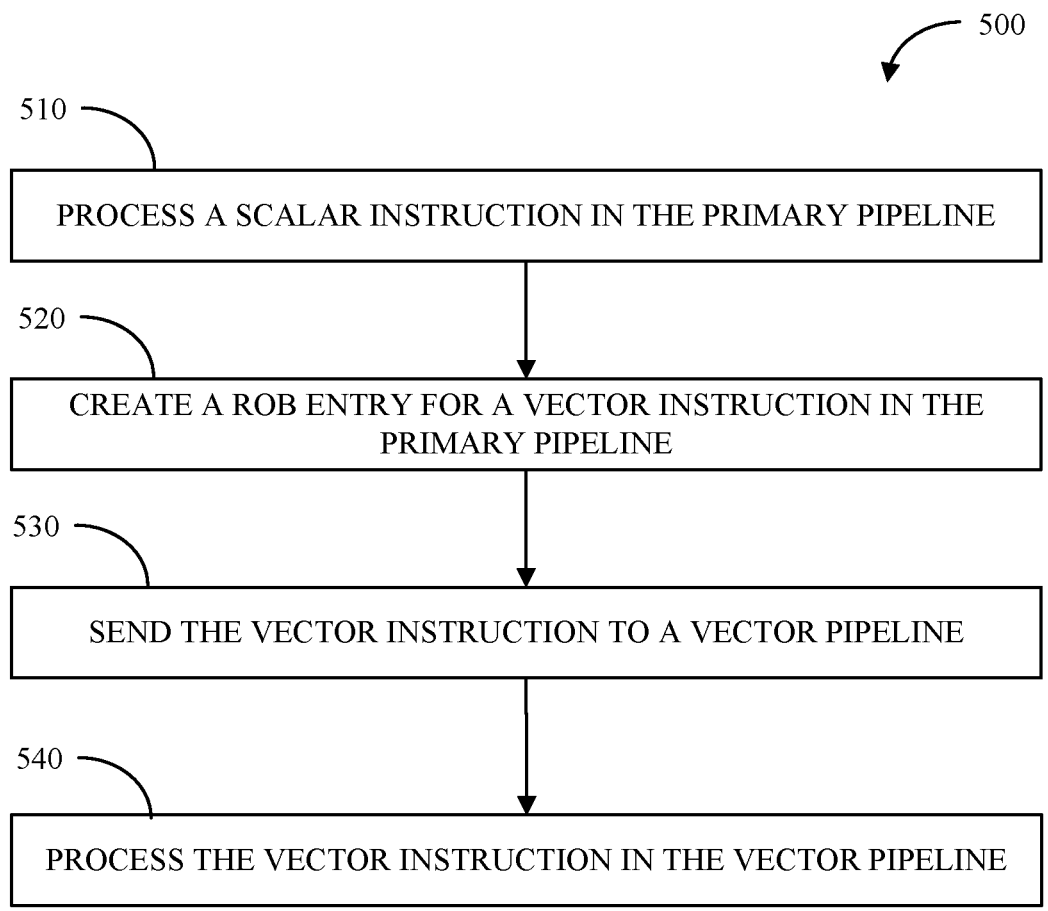
FIG. 5 is a flow chart of a method for cracking vector instructions after scalar dispatch.

FIG. 5 is a flow chart of a method 500 for cracking vector instructions after scalar dispatch. The method 500 may include: processing 510 a scalar instruction in a primary pipeline; creating 520 a reorder buffer entry in a reorder buffer for a vector instruction prior to out-of-order processing in the primary pipeline; sending 530 the vector instruction to a vector pipeline; and processing 540 the vector instruction. The method 500 may be performed in the system 100 of FIG. 1, the processor core 200 of FIG. 2, the processor core 300 of FIG. 3, and/or the processor core 400 of FIG. 4.

The method 500 may include processing 510 a scalar instruction in the primary pipeline. A system, an integrated circuit, and/or a processor may include a primary pipeline and vector pipeline. In some implementations, the primary pipeline and the vector pipeline may be connected to a ROB. In some implementations, the primary pipeline may be connected to a ROB and the vector pipeline may be connected to a vector ROB, which may be connected to the ROB. In the event that a fetched instruction is a scalar instruction, the primary pipeline can process the scalar instruction including, but not limited to, generating a ROB entry, decoding, renaming, dispatching, executing the scalar instruction, and retiring the ROB entry upon execution completion. The ROB and/or the vector ROB may include a completion mechanism as described herein, as appropriate and applicable.

The method 500 may include creating 520 a reorder buffer entry in a reorder buffer for a vector instruction prior to out-of-order processing in the scalar pipeline and sending 530 the vector instruction to a vector pipeline. In the event that a fetched instruction is a vector instruction, the primary pipeline can process the vector instruction by generating a ROB entry prior to out-of-order processing and dispatching, via an in-order buffer, to a vector pipeline. The primary pipelines foregoes at least decoding and renaming with respect to the vector instruction. In the event that the vector instruction includes scalar sources and/or destinations, the primary pipeline may rename the scalar operands and send them to the vector pipeline. In the event that a fetched instruction is a vector configuration instruction, the primary pipeline may process the vector configuration instruction and provide vector configuration information to the vector pipeline so that the vector pipeline can decode or sequence the vector instruction.

The method 500 may include processing 540 the vector instruction. In the event that a fetched instruction is a vector instruction, the vector pipeline can process the vector instruction including, but not limited to, updating a ROB entry in either the ROB or the vector ROB as appropriate and applicable, decoding, renaming, dispatching, executing the vector instruction, and retiring the ROB entry upon execution completion via the completion mechanism in the ROB and/or the vector ROB, as appropriate and applicable.

Figure 6:
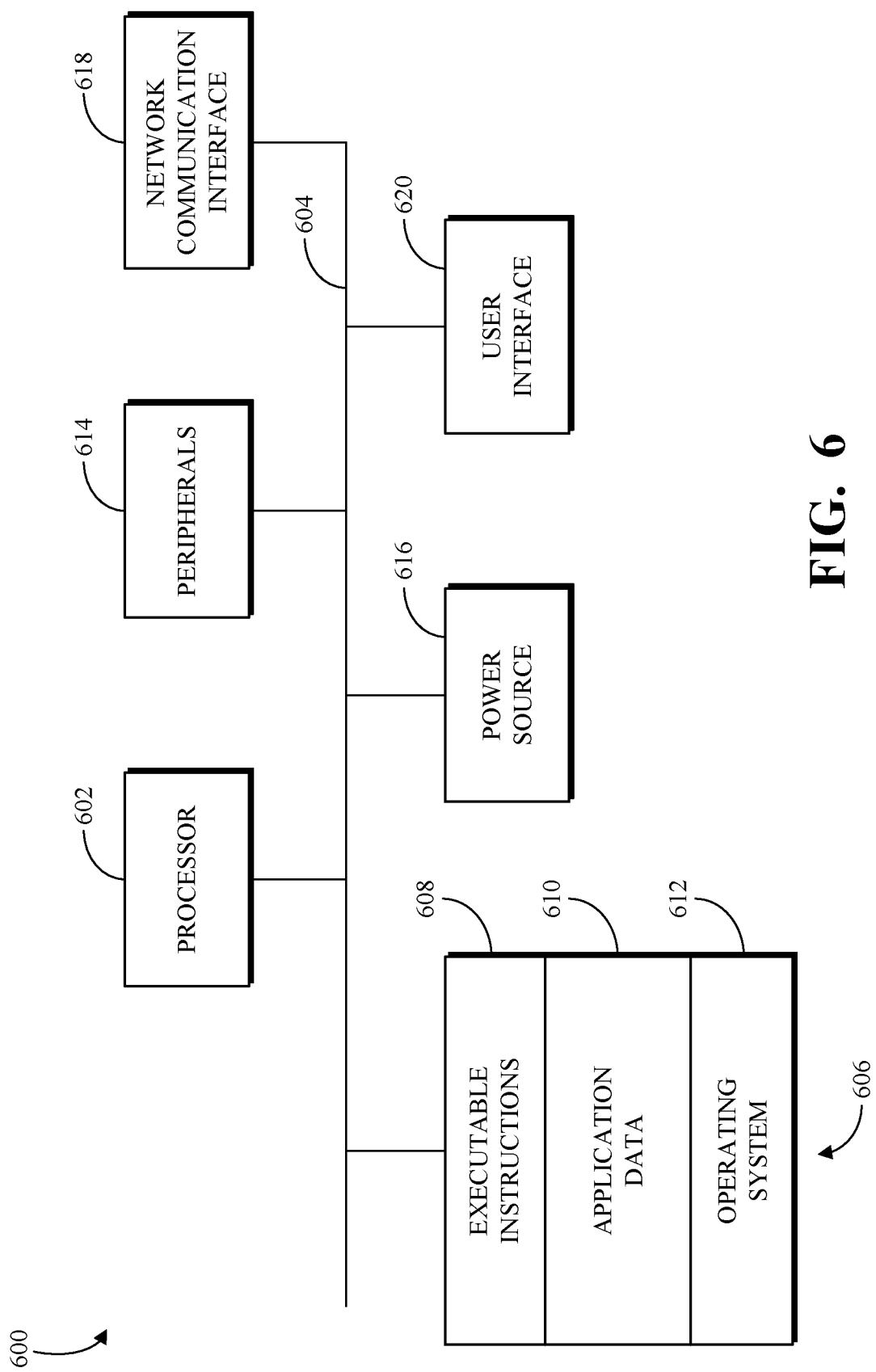
FIG. 6 is a block diagram of an example of a system for facilitating generation of a circuit representation.

FIG. 6 is a block diagram of an example of a system 600 for facilitating generation of a circuit representation, and/or for programming or manufacturing an integrated circuit. The system 600 is an example of an internal configuration of a computing device. For example, the system 600 may be used to generate a file that generates a circuit representation of an integrated circuit (e.g., the integrated circuit 105), including a processor core (e.g., the processor core 200, the processor core 300, or the processor core 400). The system 600 can include components or units, such as a processor 602, a bus 604, a memory 606, peripherals 614, a power source 616, a network communication interface 618, a user interface 620, other suitable components, or a combination thereof.

The processor 602 can be a central processing unit (CPU), such as a microprocessor, and can include single or multiple processors having single or multiple processing cores. Alternatively, the processor 602 can include another type of device, or multiple devices, now existing or hereafter developed, capable of manipulating or processing information. For example, the processor 602 can include multiple processors interconnected in any manner, including hardwired or networked, including wirelessly networked. In some implementations, the operations of the processor 602 can be distributed across multiple physical devices or units that can be coupled directly or across a local area or other suitable type of network. In some implementations, the processor 602 can include a cache, or cache memory, for local storage of operating data or instructions.

The memory 606 can include volatile memory, non-volatile memory, or a combination thereof. For example, the memory 606 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 606 can include another type of device, or multiple devices, now existing or hereafter developed, capable of storing data or instructions for processing by the processor 602. The processor 602 can access or manipulate data in the memory 606 via the bus 604. Although shown as a single block in FIG. 6, the memory 606 can be implemented as multiple units. For example, a system 600 can include volatile memory, such as random access memory (RAM), and persistent memory, such as a hard drive or other storage.

The memory 606 can include executable instructions 608, data, such as application data 610, an operating system 612, or a combination thereof, for immediate access by the processor 602. The executable instructions 608 can include, for example, one or more application programs, which can be loaded or copied, in whole or in part, from non-volatile memory to volatile memory to be executed by the processor 602. The executable instructions 608 can be organized into programmable modules or algorithms, functional programs, codes, code segments, or combinations thereof to perform various functions described herein. For example, the executable instructions 608 can include instructions executable by the processor 602 to cause the system 600 to automatically, in response to a command, generate an integrated circuit design and associated test results based on a design parameters data structure. The application data 610 can include, for example, user files, database catalogs or dictionaries, configuration information or functional programs, such as a web browser, a web server, a database server, or a combination thereof. The operating system 612 can be, for example, Microsoft Windows®, macOS® or Linux®; an operating system for a small device, such as a smartphone or tablet device; or an operating system for a large device, such as a mainframe computer. The memory 606 can comprise one or more devices and can utilize one or more types of storage, such as solid-state or magnetic storage.

The peripherals 614 can be coupled to the processor 602 via the bus 604. The peripherals 614 can be sensors or detectors, or devices containing any number of sensors or detectors, which can monitor the system 600 itself or the environment around the system 600. For example, a system 600 can contain a temperature sensor for measuring temperatures of components of the system 600, such as the processor 602. Other sensors or detectors can be used with the system 600, as can be contemplated. In some implementations, the power source 616 can be a battery, and the system 600 can operate independently of an external power distribution system. Any of the components of the system 600, such as the peripherals 614 or the power source 616, can communicate with the processor 602 via the bus 604.

The network communication interface 618 can also be coupled to the processor 602 via the bus 604. In some implementations, the network communication interface 618 can comprise one or more transceivers. The network communication interface 618 can, for example, provide a connection or link to a network, via a network interface, which can be a wired network interface, such as Ethernet, or a wireless network interface. For example, the system 600 can communicate with other devices via the network communication interface 618 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 620 can include a display; a positional input device, such as a mouse, touchpad, touchscreen, or the like; a keyboard; or other suitable human or machine interface devices. The user interface 620 can be coupled to the processor 802 via the bus 604. Other interface devices that permit a user to program or otherwise use the system 600 can be provided in addition to or as an alternative to a display. In some implementations, the user interface 620 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 614. The operations of the processor 602 can be distributed across multiple clients or servers, which can be coupled directly or across a local area or other suitable type of network. The memory 606 can be distributed across multiple clients or servers, such as network-based memory or memory in multiple clients or servers performing the operations of clients or servers. Although depicted here as a single bus, the bus 604 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
a primary pipeline configured to:
   determine a type of instruction;
   responsive to a determination that the instruction is a vector instruction, create a reorder buffer entry in a reorder buffer for the vector instruction prior to out-of-order processing in the primary pipeline; and
   send the vector instruction to a vector pipeline; and
the vector pipeline configured to process the vector instruction.

2. The integrated circuit of claim 1, wherein a dispatch unit in the primary pipeline is configured to send the vector instruction to the vector pipeline.

3. The integrated circuit of claim 2, wherein the primary pipeline foregoes decoding the vector instruction and foregoes renaming the vector instruction.

4. The integrated circuit of claim 1, wherein the primary pipeline includes an in-order buffer for storing and sending the vector instruction to the vector pipeline.

5. The integrated circuit of claim 1, wherein:
the primary pipeline is further configured to process a vector configuration instruction to generate vector configuration information; and
the vector pipeline is further configured to process the vector instruction upon receipt of the vector configuration information.

6. The integrated circuit of claim 1, wherein the primary pipeline is further configured to rename scalar operands when the vector instruction includes at least one of a scalar source or scalar destination.

7. The integrated circuit of claim 6, wherein the primary pipeline is further configured to transfer renamed scalar operands to the vector pipeline.

8. The integrated circuit of claim 1, wherein to process the vector instruction, the vector pipeline is further configured to:
decode the vector instruction into a number of micro-operations; and
update the reorder buffer entry with the number of micro-operations.

9. The integrated circuit of claim 8, wherein the primary pipeline foregoes decoding the vector instruction, foregoes renaming the vector instruction, and to process scalar instruction, the primary pipeline is further configured to:
decode the scalar instruction into a number of micro-operations;
rename the decoded scalar instruction; and
dispatch the renamed scalar instruction for execution.

10. The integrated circuit of claim 9, wherein the vector pipeline is further configured to:
dispatch the number of micro-operations for execution.

11. The integrated circuit of claim 8, wherein the reorder buffer includes a completion mechanism configured to track completed micro-operations for each reorder buffer entry and retire each reorder buffer entry upon completion of each associated micro-operation.

12. The integrated circuit of claim 11, wherein the completion mechanism is a counter.

13. The integrated circuit of claim 11, wherein the completion mechanism is a bit map.

14. The integrated circuit of claim 13, wherein a position in the bit map indicates a micro-instruction having execution issues.

15. The integrated circuit of claim 1, wherein to process the vector instruction, the vector pipeline is further configured to:
decode the vector instruction into a number of micro-operations; and
create or update a vector reorder buffer entry in a vector reorder buffer with the number of micro-operations.

16. The integrated circuit of claim 15, wherein the vector reorder buffer includes a completion mechanism configured to track completed micro-operations for the vector reorder buffer entry and signal the reorder buffer entry in the reorder buffer upon completion of each of the number of micro-operations for each reorder buffer entry in the vector reorder buffer.

17. The integrated circuit of claim 16, wherein the completion mechanism is a counter.

18. The integrated circuit of claim 16, wherein the completion mechanism is a bit map and a position in the bit map can indicate a micro-instruction having execution issues.

19. A method comprising:
determining, by a primary pipeline, a type of instruction;
responsive to a determination that the instruction is a vector instruction, creating, by the primary pipeline, a reorder buffer entry in a reorder buffer for a vector instruction prior to out-of-order processing in the primary pipeline;
sending, by the primary pipeline, the vector instruction to a vector pipeline; and
processing, by the vector pipeline, the vector instruction.

20. A non-transitory computer readable medium comprising a circuit representation that, when processed by a computer, is used to program or manufacture an integrated circuit comprising:
a processor core including a primary pipeline and a vector pipeline,
   wherein the primary pipeline:
      determines a type of instruction;
      responsive to a determination that the instruction is a vector instruction, creates a reorder buffer entry in a reorder buffer for a vector instruction prior to out-of-order processing in the primary pipeline; and
      sends the vector instruction to the vector pipeline, and
   wherein the vector pipeline:
      processes the vector instruction.

* * * * *